Sept. 16, 1958

A. N. BENSON 2,852,098

CONTINUAL PRESSURE GREASE CUP

Filed Nov. 2, 1955

INVENTOR.
ALBIN N. BENSON

BY

ATTORNEYS:

2,852,098

CONTINUAL PRESSURE GREASE CUP

Albin N. Benson, Pipersville, Pa.

Application November 2, 1955, Serial No. 544,624

1 Claim. (Cl. 184—39)

(Granted under Title 35, U. S. Code (1952), sec. 266)

The invention described herein may be manufactured and used by or for the Government for governmental purposes without the payment of any royalty thereon.

This invention relates to a grease cup of general application and has for an object to provide a simplified device of this class by means of which grease may be automatically extruded during use without the necessity for having some complicated mechanical or pneumatic connecting means for insuring substantially continuous extrustion of grease as heretofore has been necessary.

Grease cups from which grease is to be extruded intermittently or substantially continuously and slowly have been of two general classes. One such class is a manually controlled type in which a fractional turn is given to a threaded cap or its equivalent acting upon a spring pressed follower plate. While this is satisfactory for some purposes it is not adequate where the grease cup is located on a continuously moving part or where the grease needs to be fed to a bearing surface more frequently than an operator can stop the apparatus in order to make the fractional turn of the cap. The second sort of grease cup is one in which the grease is to be extruded more nearly continuously by the application of mechanical or pneumatic pressure. For example, a pawl and ratchet mechanism has been used to intermittently turn a screw cap on a grease cup, and gas under pressure has also been used to extrude grease but the gas has to be supplied through a passageway from a source of pressure. The objection to these mechanical and pneumatic mechanisms is acute where the grease cup is located on a rotating element because these mechanisms become unduly complicated.

According to this invention lubricant is enclosed in an expansible and contractible chamber around which is a liquid having a volatilizing temperature close to but slightly above that of the atmosphere and the grease cup. As the temperature of the cup and any machine to which it is attached rises, the liquid volatilizes and the grease is caused to be extruded substantially continuously. When the apparatus is stopped the grease may be fed in through a usual fitting such as an Alemite type found on automobiles. When the pressure on the grease increases and the expansible chamber increases in size during the supply of grease, the refrigerant liquid between the outer casing and the expansible chamber becomes at least partially liquefied from such increase in pressure. It is this volatile liquid which expands on turning to gas and maintains the pressure on the grease being extruded.

Figure 1:
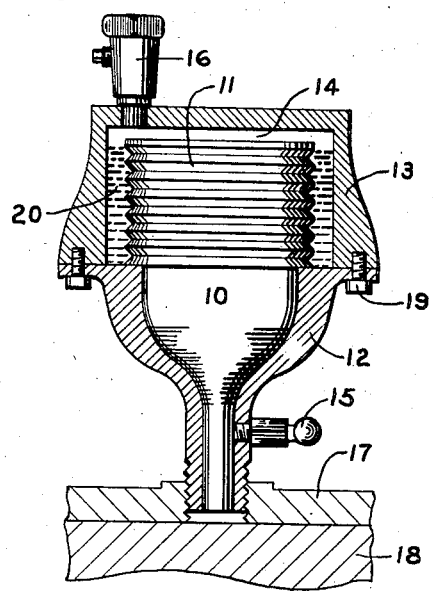
Figure 2:
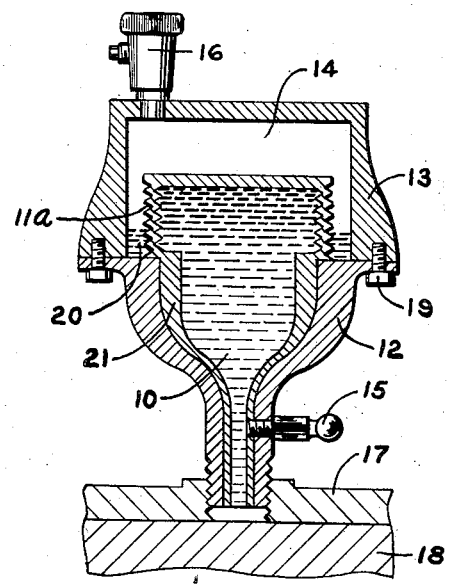

Referring to the drawing, Fig. 1 is a longitudinal section through one embodiment of this section. Fig. 2 exemplifies another embodiment.

The inside 10 of a grease cup is filled with lubricating grease, the upper portion or cover of the cup is constituted by a bellows or other expansible and contractible chamber 11 secured to the lower walls 12 of the grease cup as shown in Fig. 1. An inverted cup-shaped cover 13 is secured to the lower cup 12 and is of a size to provide a space 14 between the inverted cup 13 and the expansible chamber 11. Grease is supplied under pressure through any type of conventional fitting 15 capable of functioning as a check valve to allow the grease under pressure to be added and then closed under pressure when the gun or other external source of grease pressure has been removed. Some convenient type fitting 16, also capable of functioning as a check valve, permits some type of commercial refrigerant to be added under pressure through this fitting 16. In the drawing, the passageway through which grease is extruded and supplied to the bearing 17 around a moving shaft 18 is shown as being larger than is customary to use. The inverted upper cup 13 is preferably secured to the lower cup 12 by bolts 19, and, as is usual, some type of packing or gasket is provided between the two cups around their meeting rims. The liquid 20 shown in Fig. 1 as being outside the expansible chamber 11 is preferably some commercial type refrigerant having a volatilizing temperature adjacent the temperature of the grease cup when in use and also capable of being liquefied on increase in pressure due to filling the grease cup and the expanding of the bellows 11. The type of refrigerant material to be used will depend upon the nature of the use to which the grease and its expansible container are to be subjected because during use the temperature of the cups 12 and 13 is raised by the conduction of heat from the bearing 17. A reference to a Handbook of Chemistry and Physics, published by Chemical Rubber Publishing Co., covers the physical properties of many of the commercial refrigerants under an index heading of "refrigerants" and among those capable of being used in the present invention within the space 14 may be mentioned difluorodichloromethane, butane, isobutane and propane and many others which will be familiar to those skilled in the art.

In Fig. 2, the embodiment illustrated is quite similar to that in Fig. 1 except that the bellows 11a is integral with a lining 21 for the walls of cup 12 whereas in Fig. 1 the bellows 11 is secured to the top of the cup 12. Otherwise the same reference numerals have been used in Fig. 2 to indicate corresponding parts to what is shown in Fig. 1.

In use the grease cup is filled through the fitting 15 until the expansible chamber has been filled with grease causing it to expand under the pressure of the incoming grease. The volatile refrigerant liquid 20 is supplied in the space 14 and around the bellows 11. The pressure of the bellows alone will be sufficient to expand some grease into the bearing 17. As the bearing 17 becomes heated some of its heat is transferred by conduction to the walls of the cups 12 and 13 warming the grease and volatilizing some of the liquid 20 to increase the pressure in the space 14 on the expansible chamber and increase the amount of grease being extruded. This combined pressure of the bellows and the volatilized refrigerant is maintained. In this way a supply of grease to the bearing is maintained during use.

Among the advantages of this invention may be mentioned the simplification in construction of the grease cup whereby a fairly continuous supply of lubricant can be expected without the necessity of having complicated mechanical or pneumatic mechanisms leading to the grease cup for the substantially continual extrusion of grease. A feature of the present invention is the fact that the top of the inverted cup 13 serves as a stop or limiting abutment by means of which the expansion of the bellows chamber 11 or 11a is limited to a safe amount. Instead of the expansible chamber being of the types shown in the drawing, many other types will be familiar to those skilled in the art. Both the lubricant and the type of refrigerant will be selected according to the usage and location contemplated for the grease cup of the present invention.

I claim:

In a device for lubricating adjacent relatively movable surfaces, the combination of an enclosure having a side wall formed in part of a bellows and adapted to communicate with said surfaces, means for introducing a lubricant into said enclosure, means forming a chamber coextensive with said bellows, and a fluid within said chamber, said fluid being condensible in response to increased pressure on said lubricant.

References Cited in the file of this patent

UNITED STATES PATENTS

| | | |
|---|---|---|
| 1,160,593 | Graham | Nov. 16, 1915 |
| 1,729,960 | Murphy | Oct. 1, 1929 |
| 1,813,005 | West | July 7, 1931 |
| 2,007,482 | Stitt | July 9, 1935 |